United States Patent [19]

Yoshida et al.

[11] Patent Number: 5,078,109
[45] Date of Patent: Jan. 7, 1992

[54] ENGINE OUTPUT CONTROLLING METHOD

[75] Inventors: Masato Yoshida, Kyoto; Kazuhide Togai, Osaka; Yoshiaki Danno, Kyoto; Makoto Shimada, Kyoto; Katsunori Ueda, Kyoto, all of Japan

[73] Assignee: Mitsubishi Jidosha Kogyo Kabushiki Kaisha, Tokyo, Japan

[21] Appl. No.: 472,240

[22] Filed: Jan. 30, 1990

[30] Foreign Application Priority Data

Jan. 31, 1989 [JP] Japan ................................. 1-21274
Jan. 31, 1989 [JP] Japan ................................. 1-21275

[51] Int. Cl.⁵ .............................................. F02D 11/10
[52] U.S. Cl. ..................................... 123/350; 123/399
[58] Field of Search ........................ 123/399, 340, 350

[56] References Cited

U.S. PATENT DOCUMENTS

| | | | |
|---|---|---|---|
| 4,335,694 | 6/1982 | Mausner et al. | 123/399 |
| 4,625,690 | 12/1986 | Morita | 123/399 |
| 4,727,838 | 3/1988 | Oshiage et al. | 123/399 |
| 4,919,096 | 4/1990 | Manaka et al. | 123/399 |
| 4,955,346 | 9/1990 | Kaneyasu et al. | 123/399 |

Primary Examiner—Andrew M. Dolinar
Attorney, Agent, or Firm—Wegner, Cantor, Mueller & Player

[57] ABSTRACT

In an engine output control apparatus including an engine output control means for controlling the output of an engine, an electric motor for driving the means, and a motor control means for controlling the electric motor commensurate with the state of operation of an accelerator pedal, a method of controlling the output of the engine, comprising: obtaining an engine torque target (Te) commensurate with the state of operation of the accelerator pedal; calculating a target amount of engine control ($\theta$t) based on the engine torque target (Te) and an engine speed (Ne); and controlling the engine output control means by the electric motor so as to meet with the target amount of engine control ($\theta$t).

2 Claims, 12 Drawing Sheets

MEMORY MAP 1

MEMORY MAP 2

MEMORY MAP 3

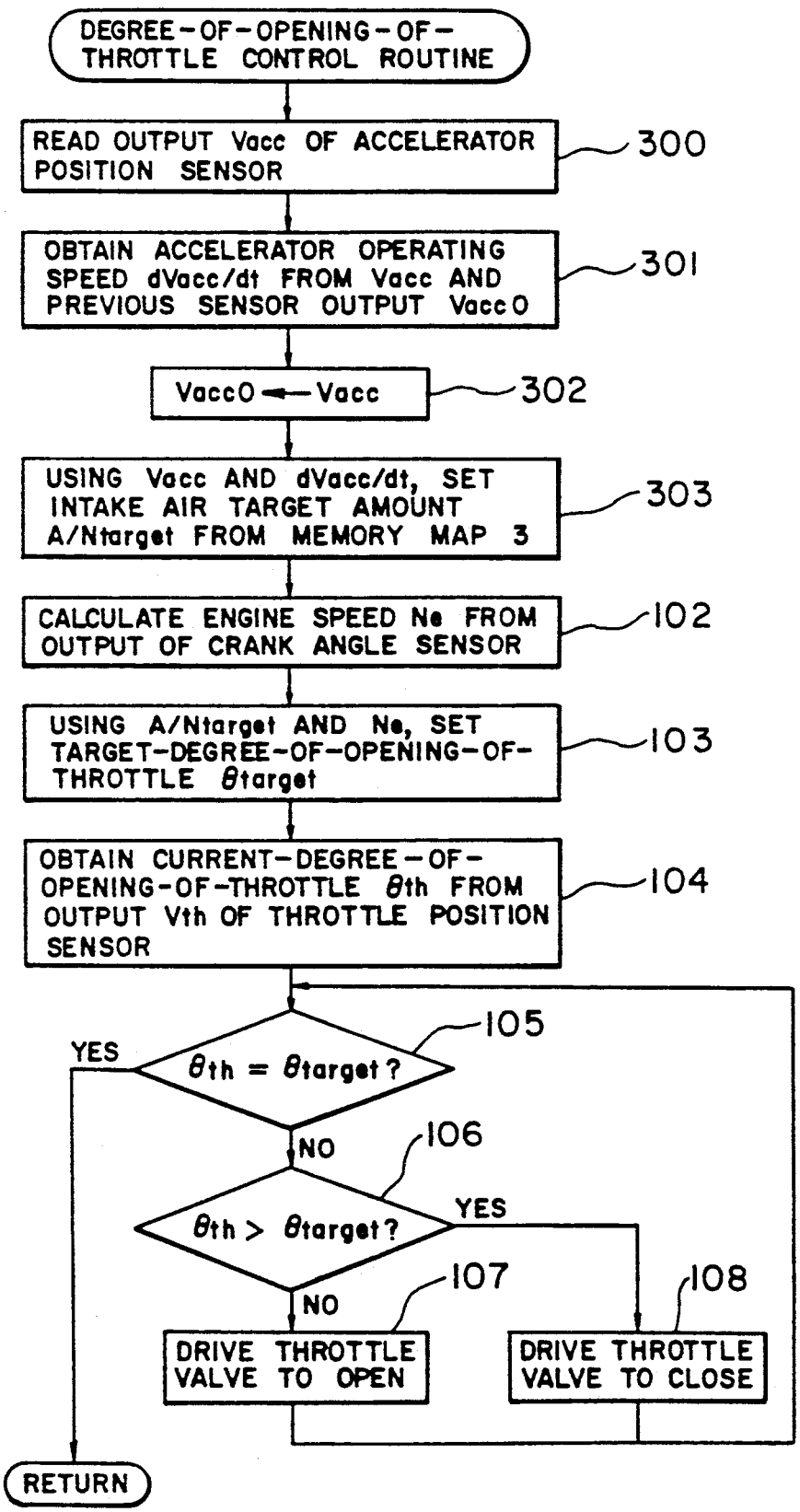

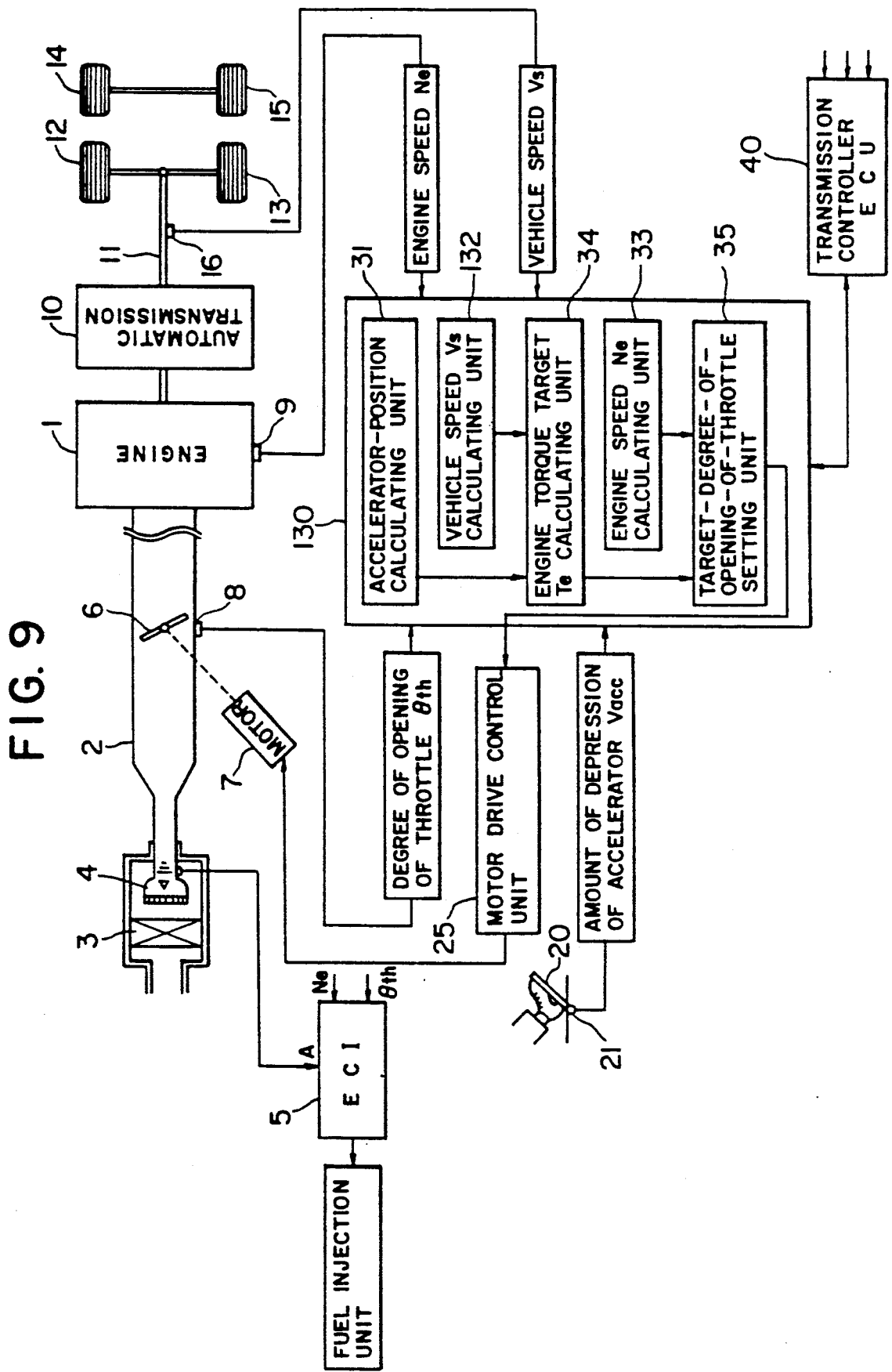

MEMORY MAP 4

ENGINE OUTPUT CONTROLLING METHOD

BACKGROUND OF THE INVENTION

1) Field of the Invention

This invention relates to an engine output controlling method for a drive-by-wire (hereinafter called "DBW") control system which drives and controls the degree of opening of a throttle valve by a motor.

2) Description of the Related Art

Heretofore it has been a common knowledge to control the output of a gasoline engine for automobile by varying the amount of intake air by regulating the degree of opening of a throttle valve disposed in an intake air passage.

The throttle valve is operatively connected to an accelerator pedal to be operated by the driver. In an electronically controlled automobile engine, the throttle valve is electronically driven by an electric motor; that is, a drive-by-wire (DBW) control system is adopted so that the degree of opening of the throttle valve can be controlled independently, apart from the operation of the accelerator pedal according to need.

However, in the conventional DBW control system, the degree of opening of the throttle valve is controlled in linear proportion to the operation of the accelerator pedal unless the throttle valve is released from the operation of the accelerator and is then controlled by the electric motor on priority basis. In other words, in controlling the throttle valve based on the operation of the accelerator, the degree of opening of the throttle is controlled in proportion to the operation of the accelerator pedal like a throttle control system of the mechanical link type in which the accelerator pedal and the throttle valve are directly connected by a wire or a link.

In general, the throttle valve is to vary the area of opening of the intake air passage to change the amount of intake air. But, as is understood from the contour of the intake air passage and the structure of the throttle valve, the degree of opening of the throttle valve is not proportional to the area of opening of the intake air passage.

Therefore the degree of opening of the throttle valve and the amount of intake air are not linearly proportional to each other; that is, the state of operation of the accelerator pedal is not necessarily proportional to the output of the engine.

Consequently, it has hitherto been customary for the driver to operate the accelerator pedal by the rule of trial and error or in his/her estimation using the instinct on experiences.

However, in the conventional DBW control system, by utilizing the characteristic that the throttle valve is controlled individually by the electric motor, it is possible to read the required output of the engine from the state of operation of the accelerator and then to vary the degree of opening of the throttle valve so as to obtain a target amount of intake air that causes this required engine output.

In that case, yet another method of controlling the throttle valve could be adopted to read, from the position of depression of the accelerator pedal, an engine torque target or a drive shaft torque target as the required value, and then to obtain the most suitable engine output so as to create a desired engine torque or drive shaft torque from the position of depression of the accelerator pedal.

With that arrangement, a desired engine torque or drive shaft torque can be obtained readily from the position of depression of the accelerator pedal, causing improved response. But in controlling an engine torque target or a drive shaft torque target from the position of depression of the accelerator pedal, a predetermined position of depression of the accelerator pedal will produce a predetermined amount of torque so that a constant engine torque can be created if the position of depression of the accelerator pedal is kept constant when the vehicle is running on a downhill road, The vehicle is thereby accelerated.

Specifically, in the case where the vehicle is running on a flat load with the position of the accelerator pedal remaining constant, because the output engine torque is constant, if the transmission gear ratio and the vehicle resistance are constant, the running speed of the vehicle converges to a constant speed using the full engine torque without creating any surplus.

Nonetheless, when the vehicle is shifted to a downhill running with the position of depression of the accelerator pedal, the output engine torque is constant, and instead such large torque is not needed for a downhill running so that an excess torque is created to make an acceleration with as time passes.

For converging such acceleration to a predetermined value, the depressed accelerator pedal have to be returned to some extent to reduce the degree of opening of the throttle valve so as to lower the engine output.

However, in the throttle control system of the mechanical link type in which the accelerator pedal and the throttle valve are directly connected to each other by a wire or a link, as is apparent from the characteristic graph of FIG. 4, if the position of depression of the accelerator pedal is constant, the output of the engine is automatically lowered as the engine speed rises. Therefore in downhill running, the engine torque is lowered as the number of rotations of the engine ($=$vehicle speed) rises without returning the depressed accelerator pedal, thus causing the engine brake to start working. Consequently in downhill running, if the position of operation of the accelerator pedal is kept constant, the vehicle speed can converge to a predetermined value.

From the foregoing, if arrangements are set to produce a constant torque by a constant amount of depression of the accelerator pedal in the DBW control system, it is necessary to take the trouble to return the accelerator pedal when the vehicle speed rises in downhill running. To the contrary, such returning is unnecessary in the case of a throttle control system of the mechanical link type. So if the vehicles with these two systems are driven respectively, different driving ways are required as discussed above, thus each giving a different touch to the driver.

SUMMARY OF THE INVENTION

It is therefore an object of this invention to provide an engine output control method, in a DBW system that electronically controls a throttle valve by the motor drive, in which method it can be read, from the position of depression of an accelerator pedal or the state of operation of the accelerator pedal, such as the depression speed, that the driver makes a request for a predetermined engine output, and the throttle valve can be controlled to produce the requested engine output.

Another object of the invention is to provide an engine output control method, for example in a DBW system that electronically controls an engine output control means such as a throttle valve by the motor drive, in which method an engine torque target or a drive shaft torque target can be set in such a manner that like a throttle control system of the mechanical link type, the vehicle speed automatically converges to a predetermined value even when with a constant amount of depression of the accelerator pedal, the vehicle speed is about to start rising, thus giving a different feeling or touch to the driver.

According to first aspect of this invention, there is provided in engine an output control apparatus including an engine output control means for controlling the output of an engine, an electric motor for driving the control means, and a motor control means for controlling the electric motor commensurate with the state of operation of an accelerator pedal, a method of controlling the output of the engine, comprising: obtaining an engine torque target (Te) commensurate with the state of operation of the accelerator pedal; calculating a target amount of engine control ($\theta$t) based on said engine torque target (Te) and an engine speed (Ne); and controlling said engine output control means by said electric motor so as to meet with said target amount of engine control ($\theta$t).

According to a second aspect of this invention, there is provided in an engine output control apparatus including an engine output control means for controlling the output of an engine, an electric motor for driving the control means, and a motor control means for controlling the electric motor commensurate with the state of operation of an accelerator pedal, a method of controlling the output of the engine, comprising: calculating a target amount of intake air per engine rotation (A/Ntarget) so as to obtain a engine torque target commensurate with the state of operation of said accelerator pedal; further calculating a target amount of engine control ($\theta$target) from said target amount of intake air (A/Ntarget) and an engine speed (Ne); and controlling said engine output control means by said electric motor so as to meet with said target amount of engine control ($\theta$target).

According to a third aspect of this invention, there is provided in an engine output control apparatus including an engine output control means for controlling the output of an engine, an electric motor for driving the control means to open and close, and a motor control means for controlling the electric motor commensurate with the state of operation of an accelerator pedal, a method of controlling the output of the engine when the position of operation of said accelerator pedal is constant, comprising: obtaining, from the position of operation of said accelerator pedal and a vehicle speed, an engine torque target (Te) to which said vehicle speed converges; calculating a target amount o engine control ($\theta$target) from said engine torque target (Te) and an engine speed (Ne); and controlling said engine output control means by said electric motor so as to meet with said amount of engine control ($\theta$target).

In the engine output control method, since it comprises obtaining an engine torque target (Te) commensurate with the state of operation of the accelerator pedal, calculating a target amount of engine control ($\theta$t) based on the engine torque target (Te) and an engine speed (Ne); and controlling the engine output control means by the electric motor so as to meet with the target amount of engine control ($\theta$t), it is possible to control the engine suitably commensurate with the state of operation of the accelerator pedal.

In the method, since it comprises calculating a target amount of intake air pe engine rotation (A/Ntarget) so as to obtain a engine torque target commensurate with the state of operation of the accelerator pedal, further calculating a target amount of engine control ($\theta$target) from the target amount of intake air (A/Ntarget) and an engine speed (Ne), and controlling the engine output control means by the electric motor so as to meet with the target amount of engine control ($\theta$target), it is possible to readily obtain a amount of intake air required for producing a requested engine output, namely, a desired engine output can be readily obtained commensurate with the state of operation of the accelerator pedal.

In the method, it comprises obtaining, from the position of operation of the accelerator pedal and a vehicle speed, an engine torque target (Te) to which the vehicle speed converges, calculating a target amount of engine control ($\theta$target) from the engine torque target (Te) and an engine speed (Ne), and controlling the engine output control means by the electric motor so as to meet with the amount of engine control ($\theta$target). Therefore, since the vehicle speed automatically converges to a predetermined value as the position of operation of the accelerator pedal is kept constant, the driver has no need of taking the trouble to return the accelerator pedal so that no different feeling or touch can be given to the driver, compared with the case of driving the engine equipped with the throttle control system of the mechanical link type.

The above and other advantages, features and additional objects of this invention will be manifest to those versed in the art upon making reference to the following detailed description and the accompanying drawings in which several preferred embodiments in corporating the principles of this invention are shown by way of illustrative example

BRIEF DESCRIPTION OF THIS DRAWINGS

FIG. 7 is a flowchart similar to FIG. 5, showing a third embodiment;

FIG. 9 is a schematic diagram similar to FIG. 1, but showing a fourth embodiment;

DETAILED DESCRIPTION

A throttle valve driving method according to the first embodiment of this invention will now be described in connection with FIGS. 1 through 4.

Figure 1:
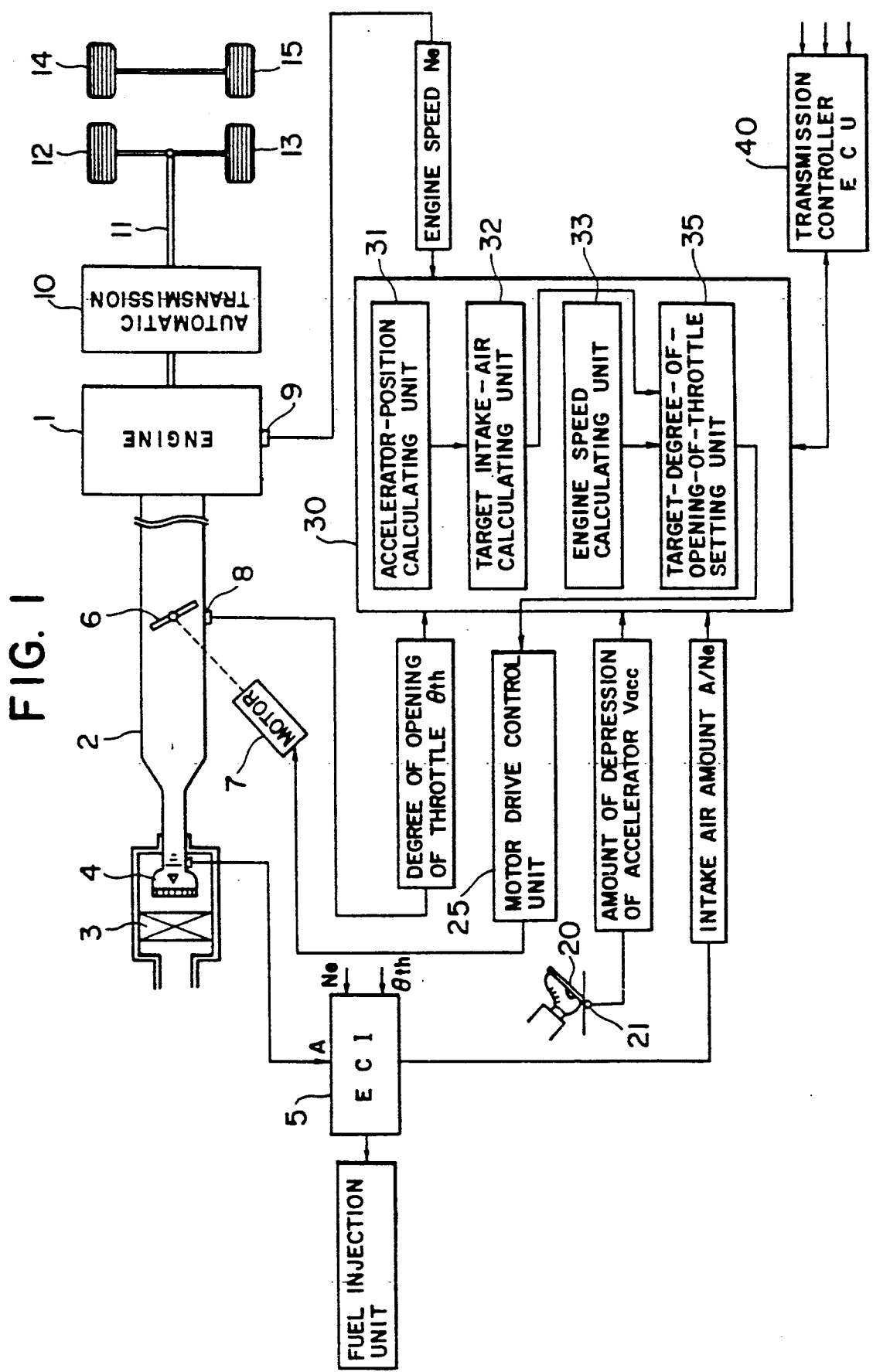
FIG. 1 is a schematic diagram showing a DBW control system embodying a first embodiment of this invention.

FIG. 1 shows the system according the first embodiment, in which reference numeral 1 designates an engine; 2, an intake air passage; 3, an air cleaner; and 4, an air flow sensor for detecting the amount of intake air taken in from the air cleaner 2.

The air flow sensor 4 may be a Karman vortex street type, for example. In this type of air flow sensor, though there is no detail illustration in the drawing, if a vortex creating post is located in the intake passage 2, an asymmetrical regular Karman vortex pattern is generated in an air flow behind the post; the number of vortices generated is proportional to the amount of air flow. When an ultrasonic wave is applied to this Karman vortex street by a transmitter, the ultrasonic wave passes across the Karman vortex street to create a wave of condensation and rareness corresponding to the number of vortices. Then a receiver receives this wave of condensation and rareness and converts it to a pulse signal. Thus this air flow sensor 4 issues to an engine control computer ECI 5 a pulse signal proportional to the amount of air flow.

In addition to the above-mentioned pulse signal proportional to the amount of intake air flow A outputted from the air flow sensor 4, an engine speed Ne signal outputted from a crank angle sensor 9 described below, and a degree of opening of throttle $\theta$th signal outputted from a throttle position sensor 8 are inputted to the engine control computer ECI 5. In the engine control computer ECI 5, using both the intake air flow amount A signal introduced from the air flow sensor 4 and the engine speed Ne signal introduced from the crank angle sensor 9, an intake air amount per engine revolution A/Ne is calculated for each and every predetermined crank angle, whereupon a basic fuel injection time is calculated commensurate with the intake air amount A/Ne. Further, the engine control computer ECI 5 calculates a fuel injection time by making corrections of various other factors to the above-mentioned basic fuel injection time and outputs a command signal to a fuel injection unit. This fuel injection unit injects fuel into the individual cylinder of the engine 1 in proportional to the abovementioned command signal. A mixed gas in proportion thus determined is formed; this mixed gas is discharged via a cycle of intake, compression and explosion, during which process the engine 1 produces the output commensurate with the amount of air taken in.

6 designates a throttle valve serving as an engine output control means disposed in the intake air passage 2. The throttle valve 6 is driven by an electric motor 7 such as a stepper motor for rotation. The area of opening of the intake air passage 2 is controlled commensurate with the degree of opening of the throttle valve 6 to thereby vary the amount of air A to be taken into the engine 1.

8 designates a throttle position sensor for detecting the angular position of the throttle valve 6. The throttle position sensor 8 may be a potentiometer, for example, which outputs the angular position of the throttle valve 6 as the degree of opening of the throttle (amount of engine control) $\theta$th in terms of voltage value.

9 designates a crank angle sensor mounted on the engine 1 for outputting the engine speed Ne.

10 designates an automatic transmission. As a converter pump of a torque converter directly connected to the output shaft of the engine 1 is rotated, this pump transmits the power to a converter turbine via a fluid in the converter. The transmission varies this power and then transmits it to a drive shaft 11.

The drive shaft 11 is connected to two drive wheels 12, 13 for rotation. 14, 15 designate follower wheels.

20 designates an accelerator pedal to which an accelerator position sensor 21 such as a potentiometer is attached. The accelerator position sensor 21 outputs the position of the accelerator pedal 20 as an accelerator pedal position signal Vacc.

Various kinds of data detected by the foregoing respective sensors are inputted to a DBW electronic control unit (hereinafter called "DBW controller") 30, whereupon the DBW controller 30 outputs a command signal to a motor drive control unit 25 that causes the electric motor 7 operative to control the throttle valve 6.

To the DBW controller 30, the intake air amount per engine revolution A/Ne from the engine control computer ECI 5, the degree of opening of the throttle $\theta$th from the throttle position sensor 8, the engine speed Ne from the crank angle sensor 9, and the accelerator pedal position Vacc from the accelerator position sensor 21 are respectively inputted.

The DBW controller 30 is composed of an accelerator state calculating unit 31, a target-intakeair-amount A/Ntarget calculating unit 32, an engine speed calculating unit 33 and a target-degree-of-opening-of-throttle calculating unit 35.

In the accelerator state calculating unit 31, the state, i.e. position in this embodiment, of operation of the accelerator pedal 20 is detected by the accelerator pedal position signal Vacc outputted from the accelerator position sensor 21, and this accelerator position signal Vacc is transmitted to the target-intake-air-amount A/Ntarget calculating unit 32.

In the target-intake-air-amount A/Ntarget calculating unit 32, a target amount of intake air A/Ntarget is calculated from the accelerator pedal position signal Vacc. The relation between the accelerator pedal position Vacc and the target amount of intake air A/Ntarget may be converted by a memory map 1 shown in FIG. 3.

Meanwhile, in the engine speed calculator unit 33, the engine speed Ne is calculated based on the output of the crank angle sensor 9.

The target amount of intake air A/Ntarget and engine speed Ne so calculated are transmitted to the target-degree-of-opening-of-throttle calculating unit 35, where the target degree of opening of throttle $\theta$target is obtained as a target amount of engine control.

Figure 4:
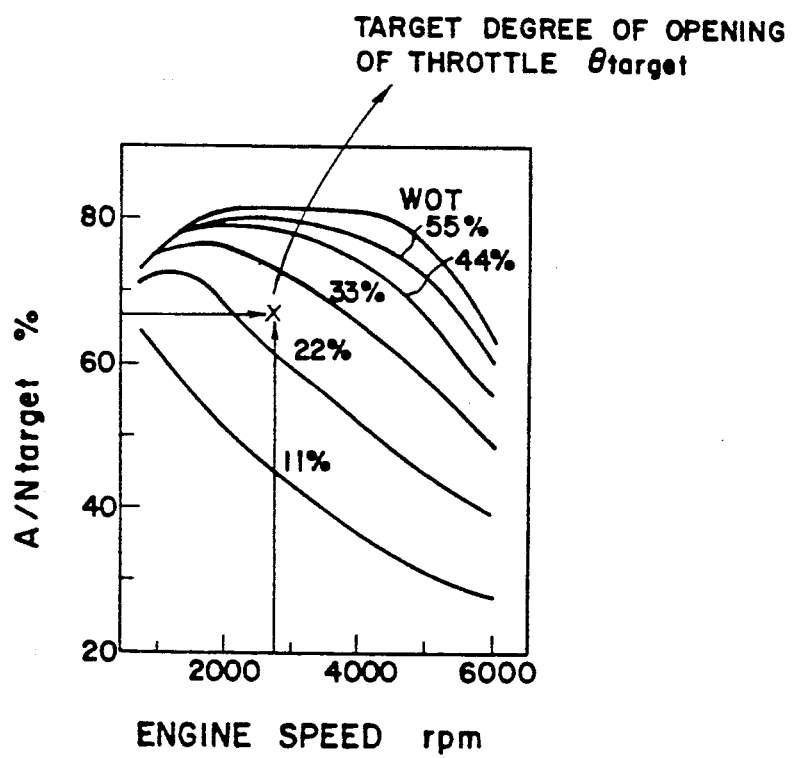
FIG. 4 is a characteristic graph showing the relationship between the engine speed, the target amount of intake air and the target degree of opening of a throttle valve in the system of FIG. 1.

The relations between the target amount of intake air A/Ntarget, the engine speed Ne, and the target degree of opening of throttle θtarget may be obtained from a characteristic graph shown in FIG. 4.

The target degree of opening of throttle θtarget obtained in the target-degree-of-opening-of-throttle calculating unit 35 is compared with the current degree of opening of throttle θth, based on which a command signal is outputted to the motor drive control unit 25. This operates the electric motor 7 to angularly move the throttle valve 6 to control the target degree of opening of throttle θtarget, thereby controlling the amount of intake air to the target amount of intake air.

As a result, the target amount of intake air A/Ntarget corresponding to the position of the accelerator pedal 20 has been obtained.

40 designates an automatic transmission controller for automatically selecting and controlling the transmission gear ratio of the transmission 10 to take a most suitable condition with respect to the relationship between the degree of opening of the throttle valve and the vehicle speed.

The operation of the DBW control system thus constructed will now be described.

Figure 2:
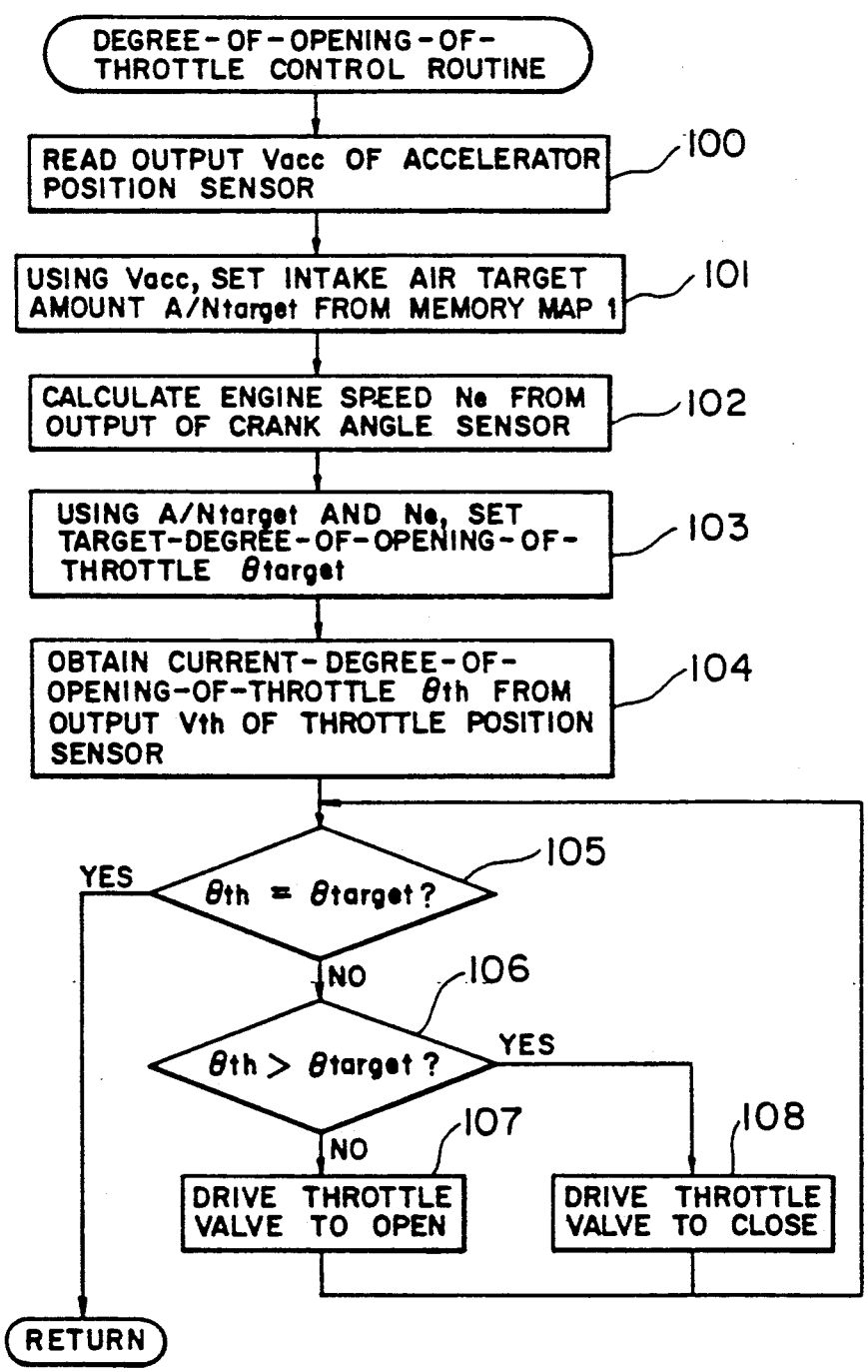
FIG. 2 is a flowchart showing the mode of operation of the DBW control system of FIG. 1.
Figure 3:
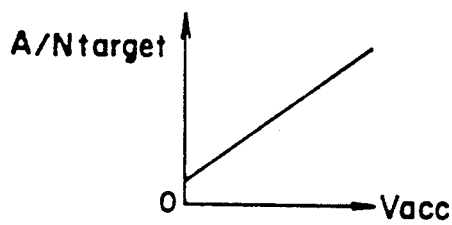
FIG. 3 is a memory map showing the relationship between the position of an accelerator pedal and the target amount of intake air in the system of FIG. 1.

In the ordinary case where the throttle valve 6 is to be operated in response to the depression of the accelerator pedal 20, the engine 1 is controlled according to the routine procedure shown in FIG. 2.

Specifically, firstly at step 100 the accelerator state calculating unit 31 reads the accelerator pedal position Vacc outputted from the accelerator position sensor 21.

Then at step 101, in the target-amount-of-intake-air setting unit 32, the target amount of intake air A/Ntarget is set based on the accelerator pedal position Vacc. This target amount of intake air A/Ntarget may be converted, based on the accelerator pedal position Vacc, from a memory map 1 shown in FIG. 3.

At step 102, in the engine speed calculating unit 33, the engine speed Ne is calculated from the output of the crank angle sensor 9.

Subsequently at step 103, in the target-degreeof-opening-of-throttle θtarget is calculated from the target amount of intake air A/Ntarget and the engine speed Ne.

The relations between the target amount of intake air A/Ntarget, the engine speed Ne, and the target degree of opening of throttle θtarget is shown in a characteristic graph of FIG. 4. Assuming that the target amount of the intake air A/Ntarget and the engine speed Ne are known, it is possible to set the target degree of opening of throttle θtarget from the characteristic graph of FIG. 4.

If the target degree of opening of throttle θtarget is thus been obtained, the target-degree-of-opening-of-throttle setting unit 35 calculates a control signal to control the throttle valve 6 commensurate with the target degree of opening of throttle θtarget.

Namely, in the target-degree-of-opening-ofthrottle setting unit 35, the current degree of opening of throttle θth is obtained from the throttle position sensor 8, as indicated at step 104.

At step 105, the current degree of opening of throttle θth and the target degree of opening of throttle θtarget are compared with each other, at which time if θth = θtarget, the routine procedure is returned to step 100.

If θth ≠ θtarget, the routine procedure advances to step 106 where if θ > θtarget, a signal "to open the throttle valve" is issued to the motor drive control unit 25, as indicated at step 107. Reversely if θ < θtarget, then a signal "to close the throttle valve" is issued to the motor drive control unit 25, as indicated at step 108.

The thus calculated signal is transmitted to the electric motor 7 by the motor drive control unit 25, whereupon the electric motor 7 is rotated forwardly and backwardly to angularly move the throttle valve 6, thereby controlling the degree of opening of the throttle valve 6.

Consequently, since the area of opening of the intake air passage 2 is varied commensurate with the degree of opening of the throttle valve 6, the amount of air A/Ne to be taken into the engine 1 is thereby varied to adjust the engine output. Therefore commensurate with the position of operation of the accelerator pedal 20, the engine torque target required to this position can be obtained directly.

This invention should by no means be limited to the first embodiment.

Figure 5:
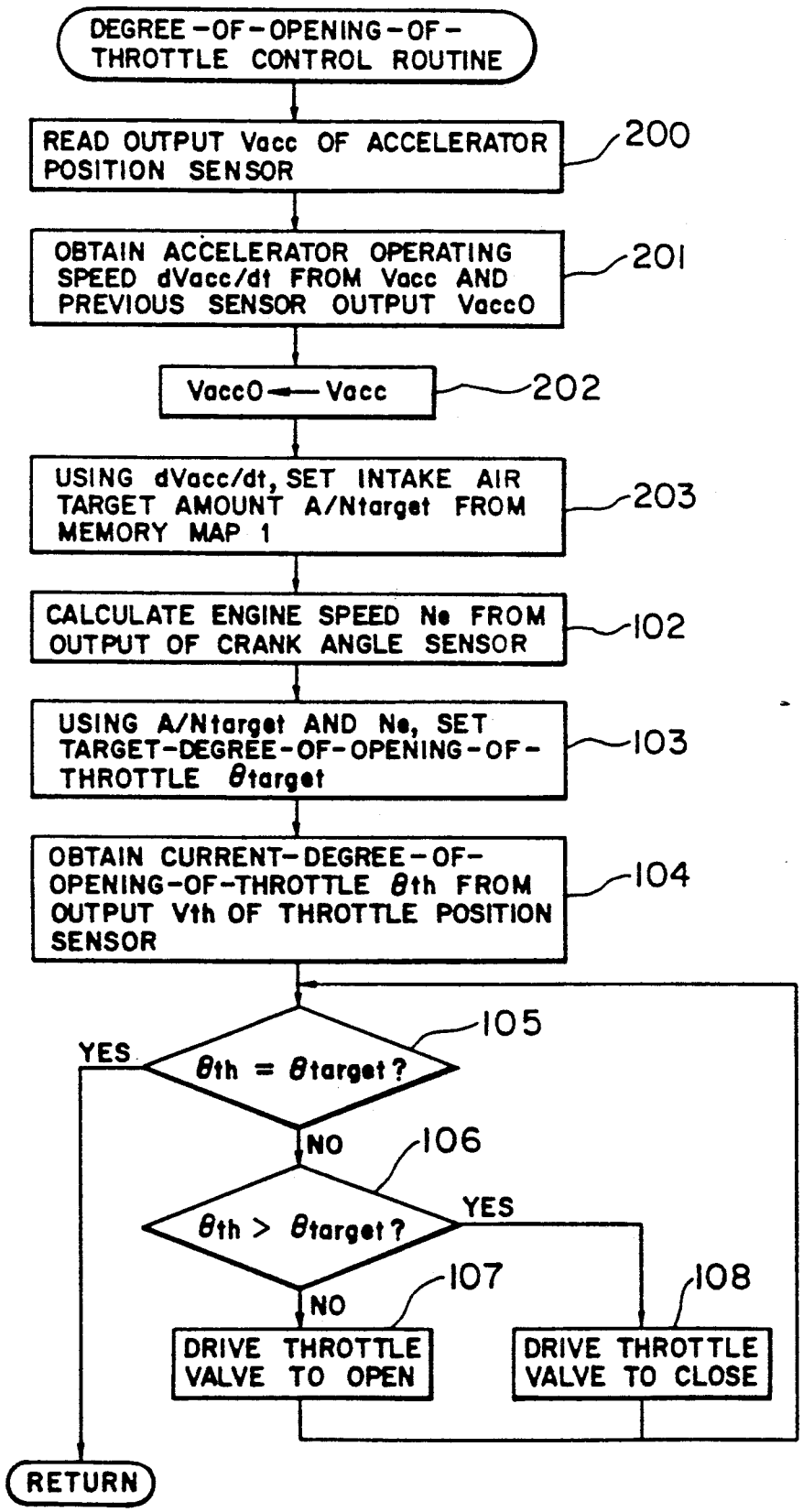
FIG. 5 is a flowchart similar to FIG. 2, but showing a second embodiment.
Figure 6:
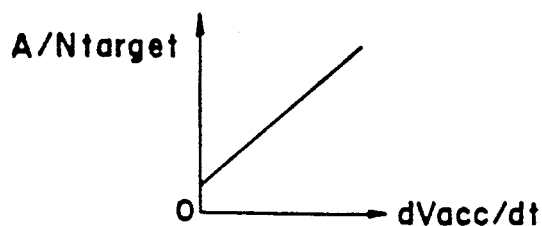
FIG. 6 is a memory map showing the relationship between the depression speed of the accelerator pedal and the target amount of intake air.

In the first embodiment, the target amount of intake air A/Ntarget is controlled from the position of the accelerator pedal Vacc. Alternatively, since there is a constant relation between the position of accelerator pedal Vacc, the depressing speed of the accelerator pedal dVacc/dt, and the target amount of intake air A/Ntarget, the depressing speed of the accelerator pedal dVacc/dt may be controlled as it is regarded to require the target amount of intake air A/Ntarget, as the second embodiment of FIGS. 5 and 6.

In the second embodiment, since this invention can be carried out in the apparatus shown in FIG. 1, its description is omitted here for clarity. But in the ordinary case where the throttle valve 6 is to be operated in cooperation with the depression of the accelerator pedal 20, the engine 1 is controlled according to the routine procedure shown in FIG. 5.

Specifically, firstly at step 200, the accelerator state calculating unit 31 reads the accelerator pedal position Vacc outputted from the accelerator position sensor 21. In the accelerator state calculating unit 31, as indicated at step 201, the depressing speed dVacc/dt of the accelerator pedal is obtained from the read accelerator pedal position Vacc and the accelerator pedal position Vacc 0 previously outputted from the accelerator position sensor At step 202, the read accelerator pedal position Vacc is stored as a datum to be used as the next reference position Vacc 0.

Then at step 203, in the target-amount-of-intake-air setting unit 32, the target amount of intake air A/Ntarget is set from the depressing speed dVacc/dt of the accelerator pedal. The target amount of intake air A/Ntarget can be converted, based on the accelerator pedal depressing speed dVacc/dt, from the memory map 2 shown in FIG. 6.

Subsequently, as the same control as the steps 102 through 108 of the first embodiment routine procedure indicated in the flowchart of FIG. 2 is made, the target amount of intake air A/Ntarget can be controlled commensurate with the accelerator pedal depressing speed dVacc/dt.

Therefore in this case, it is possible to directly obtain, commensurate with the depressing speed of the accelerator pedal 20, the engine torque target required by this depressing speed.

According to this invention, it is also possible to control the target amount of intake air A/Ntarget according to both the position Vacc and depressing speed dVacc/dt of the accelerator pedal.

Figure 8:
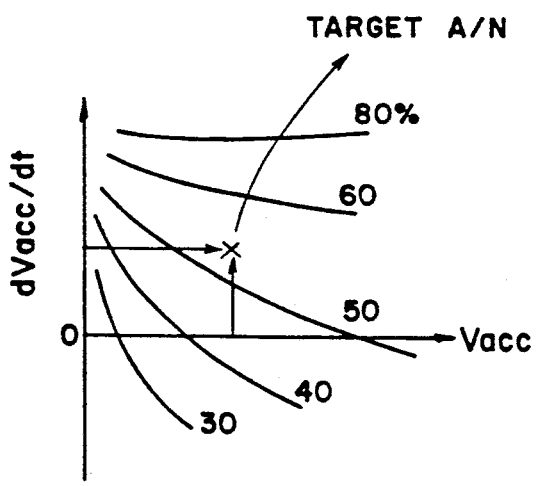
FIG. 8 is a memory map showing the relationship between the position of the accelerator pedal, the depression speed of the accelerator pedal and the target amount of intake air.

The example of this case will now be described as the third embodiment shown in FIGS. 7 and 8.

Also in the third embodiment, since this invention can be carried out in the apparatus shown in FIG. 1, its description is omitted here for clarity. But in the ordinary case where the throttle valve 6 is to be operated in cooperation with the depression of the accelerator pedal 20, the engine 1 is controlled according to the routine procedure shown in FIG. 7.

Specifically, firstly at step 300, the accelerator state calculating unit 31 reads the accelerator pedal position Vacc outputted from the accelerator position sensor 21. In the accelerator state calculating unit 31, as indicated at step 201, the depressing speed dVacc/dt of the accelerator pedal is obtained from the read accelerator pedal position Vacc and the accelerator pedal position Vacc 0 previously outputted from the accelerator position sensor 21.

At step 302, the read accelerator pedal position Vacc is stored as a datum to be used as the next reference position Vacc 0.

Then at step 303, in the target-amount-of-intake-air setting unit 32, the target amount of intake air A/Ntarget is set from the depressing speed dVacc/dt of the accelerator pedal. The target amount of intake air A/Ntarget can be converted, based on the accelerator pedal depressing speed dVacc/dt, from the memory map 3 shown in FIG. 8.

Subsequently, as the same control as the steps 102 through 108 of the first embodiment routine procedure indicated in the flowchart of FIG. 2 is made, the target amount of intake air A/Ntarget can be controlled commensurate with the accelerator pedal depressing speed dVacc/dt.

Therefore in this case, it is possible to directly obtain, commensurate with the depressing speed of the accelerator pedal 20, the engine torque target required by this depressing speed.

In each of the foregoing embodiments, the target amount of intake air A/Ntarget is obtained from the position Vacc and the depressing speed dVacc/dt of the accelerator pedal, and the target degree of opening of the throttle θtarget to accomplish this target amount of intake air A/Ntarget, whereupon this target degree of opening of throttle θtarget and the actual degree of opening of throttle θth are compared with each other to control the throttle valve 6 so as to meet with the target degree of opening of throttle θtarget. However, in this invention, after the control means as well as the throttle valve 6 meets met with the target degree of opening of throttle θtarget, it is detected whether the current amount of intake air A/Ne meets with the target amount of intake air A/Ntarget. This may be feedback-controlled.

In other words, even though the throttle valve 6 meets with the target degree of opening of throttle θtarget, the actual amount of intake air A/Ne does not necessarily meet with the target amount of intake air A/Ntarget due to the fluctuation of passage resistance of the intake passage and the fluctuation of manufacture of the intake air passage and the throttle valve. Therefore, to meet the actual amount of intake air A/Ne with the target amount intake air A/Ntarget, the actual amount of intake air A/Ne and the target amount of intake air A/Ntarget are compared with each other, whereupon if there is a differential between the actual amount of intake air A/Ne and the target amount of intake air A/Ntarget, it is preferred to correct the actual amount of intake air A/Ne is corrected so as to meet with the target amount of intake air A/Ntarget.

In this case, for example, a differential between the actual degree of throttle θth and the target degree of opening of throttle θtarget, or a value corresponding to this differential, is retained as a corrected value, whereupon this corrected value is added or multiplied, for example, to the degree of opening of throttle obtained by the target-degree-of-opening-of-throttle setting unit 35 to determine the target degree of opening of throttle θtarget. Alternatively, at that time, the current differential, or the datum obtained from a value corresponding to this current differential, may be added or multiplied, for example, to the previously obtained corrected value to provide the current corrected value.

In the foregoing embodiments, the position of the throttle valve 6 is detected by the throttle position sensor 8 such as a potentiometer. Alternatively, in the case where the electric motor 7 is a stepper motor, since the angular position of this stepper motor is calculated from a given number of pulses, the number of pulses may be counted and may be stored so that the number of pulses is added and subtracted commensurate with the amount of angular movement of the motor to confirm the position of the throttle valve 6. Therefore, instead of the throttle position sensor 8, a pulse counting means may be used.

Further, the DBW control system of this invention may be used with, in addition to the automatic transmission control system, an idling rotation control system or an auto-cruise control system. In short, the throttle valve may be used in an electrically driven motor.

The fourth embodiment of this invention will now be described in connection with FIGS. 9 through 13.

FIG. 9 shows the system according the first embodiment, in which the same reference numerals as those in FIG. 1 designate similar parts. 1 designates an engine; 2, an intake air passage; 3, an air cleaner; and 4, an air flow sensor for detecting the amount of intake air taken in from the air cleaner 2.

Like the first embodiment, the air flow sensor 4 may be a Karman vortex street type, for example. In this type of air flow sensor, though there is no detail illustration in the drawing, if a vortex creating post is located in the intake passage 2, an asymmetrical regular Karman vortex pattern is generated in an air flow behind the post; the number of vortices generated is proportional to the amount of air flow. When an ultrasonic wave is applied to this Karman vortex street by a transmitter, the ultrasonic wave passes across the Karman vortex street to create a wave of condensation and rareness corresponding to the number of vortices. Then a receiver receives this wave of condensation and rareness and converts it to a pulse signal. Thus this air flow sensor 4 issues to an engine control computer ECI 5 a pulse signal proportional to the amount of air flow.

Like the first embodiment, in addition to the above-mentioned pulse signal proportional to the amount of intake air flow A outputted from the air flow sensor 4, an engine speed Ne signal outputted from a crank angle sensor 9 described below, and a degree of opening of throttle θth signal outputted from a throttle position sensor 8 are inputted to the engine control computer ECI 5. In the engine control computer ECI 5, using both the intake air flow amount A signal introduced from the air flow sensor 4 and the engine speed Ne signal introduced from the crank angle sensor 9, an intake air amount per engine revolution A/Ne is calculated for each and every predetermined crank angle, whereupon a basic fuel injection time is calculated commensurate with the intake air amount A/Ne. Further, the engine control computer ECI 5 calculates a fuel injection time by making corrections of various other factors to the above-mentioned basic fuel injection time and outputs a command signal to a fuel injection unit. This fuel injection unit injects fuel into the individual cylinder of the engine 1 in proportional to the above-mentioned command signal. A mixed gas in proportion thus determined is formed; this mixed gas is discharged via a cycle of intake, compression and explosion, during which process the engine 1 produces the output commensurate with the amount of air taken in.

6 designates a throttle valve serving as an engine output control means disposed in the intake air passage 2. The throttle valve 6 is driven by an electric motor 7 such as a stepper motor for rotation. The area of opening of the intake air passage 2 is controlled commensurate with the degree of opening of the throttle valve 6 to thereby vary the amount of air A to be taken into the engine 1.

8 designates a throttle position sensor for detecting the angular position of the throttle valve 6. The throttle position sensor 8 may be a potentiometer, for example, which outputs the angular position of the throttle valve 6 as the degree of opening of the throttle (amount of engine control) $\theta$th in terms of voltage value.

9 designates a crank angle sensor mounted on the engine 1 for outputting the engine speed Ne.

10 designates an automatic transmission. As a converter pump of a torque converter directly connected to the output shaft of the engine 1 is rotated, this pump transmits the power to a converter turbine via a fluid in the converter. The transmission varies this power and then transmits it to a drive shaft 11.

The drive shaft 11 is connected to two drive wheels 12, 13 for rotation. 14, 15 designate follower wheels.

16 designates a wheel speed sensor for detecting the number of rotations of the drive shaft 11 by speedometer attached to the drive shaft 11 and for converting the number of rotations of the drive shaft 11 in terms of vehicle speed. The wheel speed sensor 16 may output a mean speed Vs of the drive wheels 12, 13.

20 designates an accelerator pedal to which an accelerator position sensor 21 such as a potentiometer is attached. The accelerator position sensor 21 outputs the position of the accelerator pedal 20 as an accelerator pedal position signal Vacc.

Various kinds of data detected by the foregoing respective sensors are inputted to a DBW electronic control unit (hereinafter called "DBW controller") 130, whereupon the DBW controller 130 outputs a command signal to a motor drive control unit 25 that causes the electric motor 7 operative to control the throttle valve 6.

To the DBW controller 130, the intake air amount per engine revolution A/Ne from the engine control computer ECI 5, the degree of opening of the throttle $\theta$th from the throttle position sensor 8, the engine speed Ne from the crank angle sensor 9, and the accelerator pedal position Vacc from the accelerator position sensor 21 are respectively inputted.

The DBW controller 130 is composed of an accelerator state calculating unit 31, a target-intakeair-amount A/Ntarget calculating unit 132, an engine speed calculating unit 33 and a target-degree-ofopening-of-throttle calculating unit 35.

In the accelerator state calculating unit 31, the position of the accelerator pedal 20 is detected by an accelerator position signal Vacc outputted from the accelerator position sensor 21, and this accelerator position signal Vacc is transmitted to the engine torque target calculating unit 34.

In the vehicle speed Vs calculating unit 132, a vehicle speed Vs is calculated based on a signal outputted from the wheel speed sensor 16 and is transmitted to the engine torque target calculating unit 34.

The engine speed calculating unit 33 calculates the engine speed Ne from a signal outputted from the crank angle sensor 9, and transmits this engine speed Ne to the target-degree-of-opening-of-throttle setting unit 35.

In the engine torque target calculating unit 34, the engine torque target Te is calculated from the accelerator pedal position signal Vacc and the vehicle speed Vs. The relation between the accelerator pedal position Vacc, the vehicle speed Vs, and the engine torque target Te may be converted by a memory map 1 shown in FIG. 11.

Figure 11:
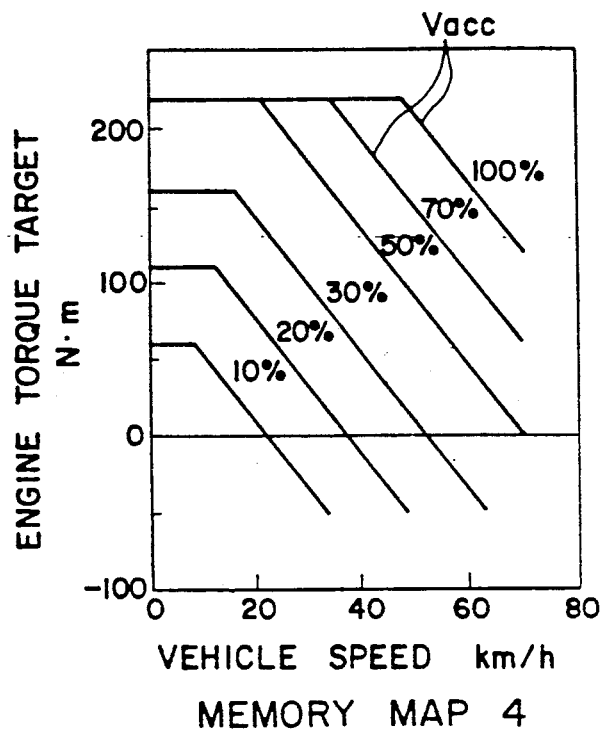
FIG. 11 is a memory map showing the relationship between the vehicle speed, the engine torque tart and the position of depression of the accelerator pedal in the system of FIG. 9.

In FIG. 11, at the lower region of the vehicle speed Vs, it is set such that the engine torque target Te will be substantially constant even if the vehicle speed increases when the accelerator pedal position Vacc is constant. At the reagion over lower region of the vehicle speed Vs, it is set such that the engine torque target Te linearly even if the vehicle speed increases when the accelerator pedal position Vacc is constant.

In the target-degree-of-opening-of-throttle setting unit 35, the target degree of opening of throttle $\theta$target as the target amount of engine control is obtained from both the engine torque target Te obtained in the engine torque target calculating unit 34, and the engine speed Ne calculated in the engine speed Ne calculating unit 33. The target degree of opening throttle $\theta$target may be obtained, based on the engine output target Te and the engine speed Ne, from a characteristic graph shown in FIG. 12.

Figure 12:
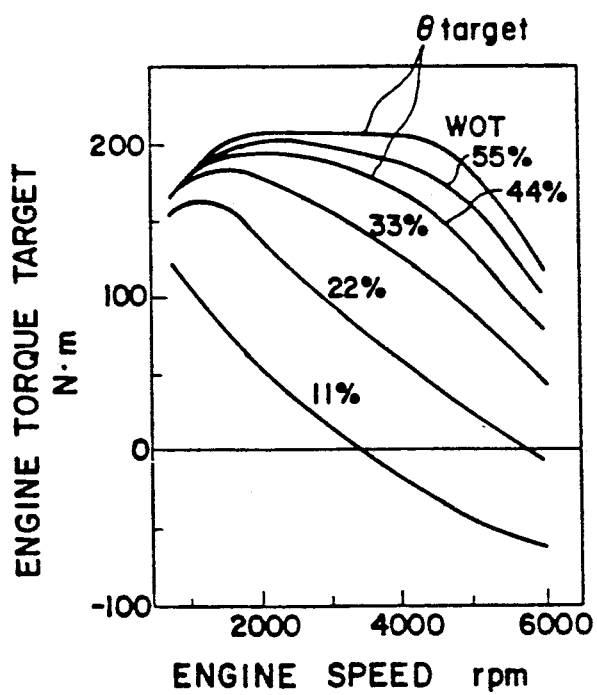
FIG. 12 is a characteristic graph showing the relationship between the engine speed, the engine torque target and the degree of opening of the throttle valve in the fourth embodiment.

The characteristic graph of FIG. 12 is very similar to the characteristic of the conventional throttle control system of the mechanical link type unlike the DBW control system. From this characteristic graph, the target degree of opening of throttle $\theta$target can be calculated based on the engine output target Te and the engine speed Ne.

The target degree of opening of throttle $\theta$target obtained in the target-degree-of-opening-of-throttle calculating unit 35 is outputted to the motor drive control unit 25 as a command signal. This motor drive control unit 25 operates the electric motor 7 to angularly move the throttle valve 6 to control the amount of intake air, thereby controlling the engine output torque to the engine output target.

40 designates an automatic transmission controller for automatically selecting and controlling the transmission gear ratio of the transmission 10 to take a most suitable condition with respect to the relationship between the degree of opening of the throttle valve and the vehicle speed.

The operation of the DBW control system thus constructed will now be described.

Figure 10:
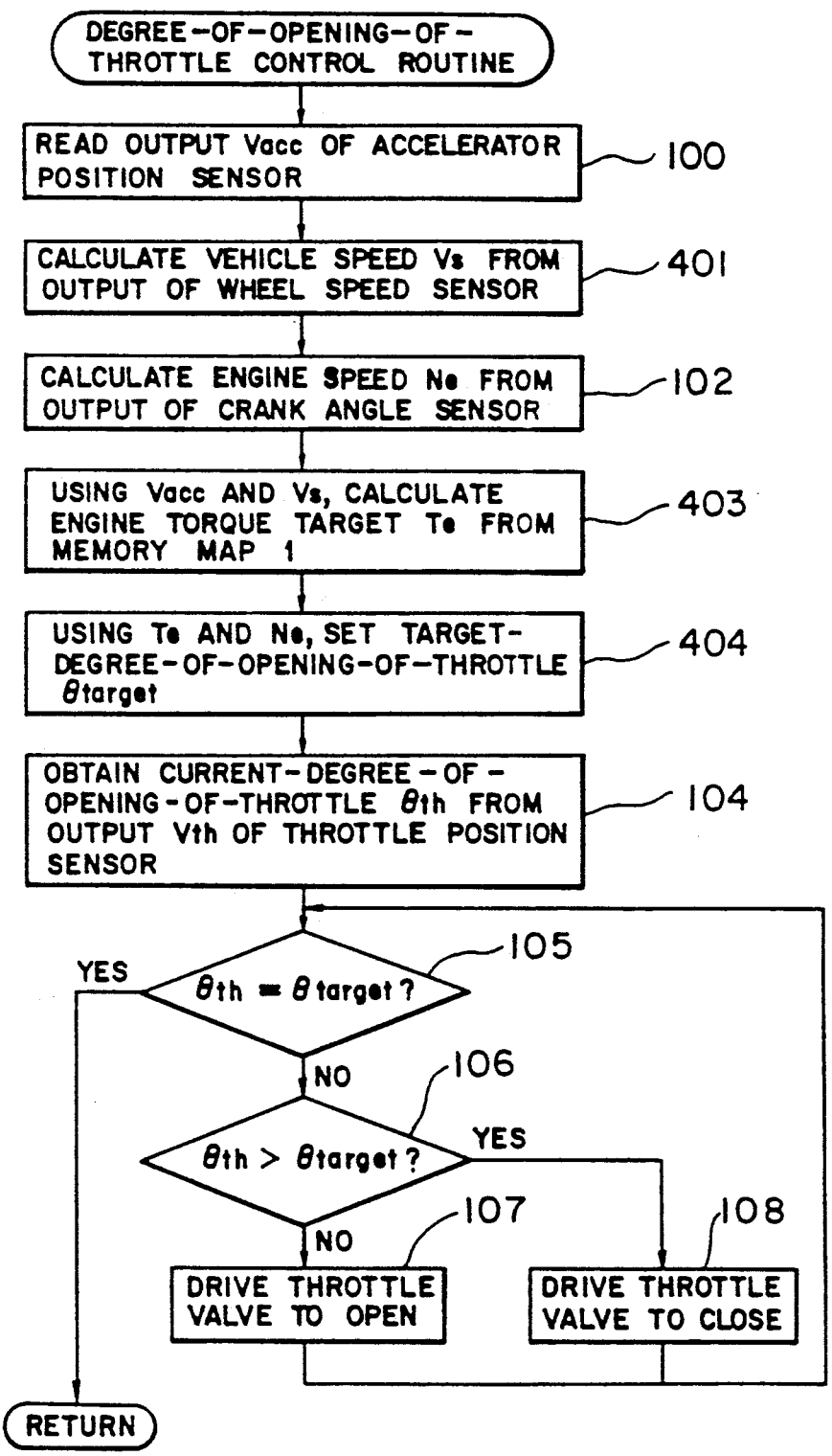
FIG. 10 is a flowchart showing the mode of operation of the fourth embodiment.

In the ordinary case where the throttle valve 6 is to be operated in response to the depression of the accelerator pedal 20, the engine 1 is controlled according to the routine procedure shown in FIG. 10.

Specifically, firstly at step 100, the accelerator state calculating unit 31 reads the accelerator pedal position Vacc outputted from the accelerator position sensor 21.

Then at step 401, in the vehicle speed Vs calculating unit 132, the vehicle speed Vs is calculated based on the wheel speed sensor output from the wheel speed sensor 16.

At step 102, in the engine speed Ne calculating unit 33, the engine speed Ne is calculated from the output of the crank angle sensor 9.

Subsequently at step 403, in the engine torque target calculating unit 34, an engine torque target Te is calculated from the position signal Vacc of the accelerator pedal 20 and the vehicle speed Vs. This calculation is performed based on the memory map of FIG. 11.

At step 404, in the target-degree-of-opening-of-throttle setting unit 35, the target degree of opening of throttle $\theta$target is calculated using the engine torque target Te and the engine speed Ne.

The relations between the target amount of intake air A/Ntarget, the engine speed Ne, and the target degree of opening of throttle $\theta$target is shown in a characteristic graph of FIG. 12. Assuming that the engine torque target Te and the engine speed Ne are known, it is possible to set the target degree of opening of throttle $\theta$target from the characteristic graph of FIG. 12.

If the target degree of opening of throttle $\theta$target is thus been obtained, the target-degree-of-opening-of-throttle setting unit 35 calculates a control signal to control the throttle valve 6 commensurate with the target degree of opening of throttle $\theta$target.

Namely, in the target-degree-of-opening-ofthrottle setting unit 35, the current degree of opening of throttle $\theta$th is obtained from the throttle position sensor 8, as indicated at step 104.

At step 105, the current degree of opening of throttle $\theta$th and the target degree of opening of throttle $\theta$target are compared with each other, at which time if $\theta$th = $\theta$target, the routine procedure is returned to step 100.

If $\theta$th $\neq$ $\theta$target, the routine procedure advances to step 106 where if $\theta >$ $\theta$target, a signal "to open the throttle valve" is issued to the motor drive control unit 25, as indicated at step 107. Reversely if $\theta <$ $\theta$target, then a signal "to close the throttle valve" is issued to the motor drive control unit 25, as indicated at step 108.

The thus calculated signal is transmitted to the electric motor 7 by the motor drive control unit 25, whereupon the electric motor 7 is rotated forwardly and backwardly to angularly move the throttle valve 6, thereby controlling the degree of opening of the throttle valve 6.

Accordingly, since the area of opening of the intake air passage 2 is varied commensurate with the degree of opening of the throttle valve 6, the amount of air A to be taken into the engine 1 is thereby varied to adjust the engine output. Therefore the engine torque target Td can be obtained.

As a result, when the vehicle is making a downhill running with the position of depression of the accelerator pedal 20 constant, the DBW controller 130 automatically controls the degree of opening of the throttle valve 6 even if the position of the accelerator pedal 20 is constant. As the engine speed increases, the DBW controller 130 lowers the engine torque as indicated in the characteristic graph of FIG. 11 so that the engine brake starts working to cause the vehicle speed to automatically converge. Therefore it is unnecessary to take the trouble of returning the accelerator pedal 20, thus giving to the driver no different feeling or touch, compared with when operating the engine equipped with a throttle control system of the mechanical link type.

As shown in the characteristic graph of FIG. 11, at the lower region of the vehicle speed Vs, if the engine torque target Te is set to substantially a constant value when the accelerator pedal position Vacc is constant, the torque at the start of acceleration or at the start of running is extended to become excellent, compared with when the engine torque target Te is reduced, thus improving the response according to the mind of the driver.

This invention should by no means be limited to the fourth embodiment.

In the fourth embodiment, the engine torque target Te is obtained from the position of depression of the accelerator pedal Vacc and the vehicle speed Vs. Alternatively, first the drive shaft torque target Td may be obtained from the position of depression of the accelerator pedal Vacc and the vehicle speed Vs, and then the engine torque target Te may be obtained from this drive shaft torque target Td.

The construction and operation of the lastmentioned embodiment will now be described as a fifth embodiment in connection with FIGS. 13 through 15.

Figure 13:
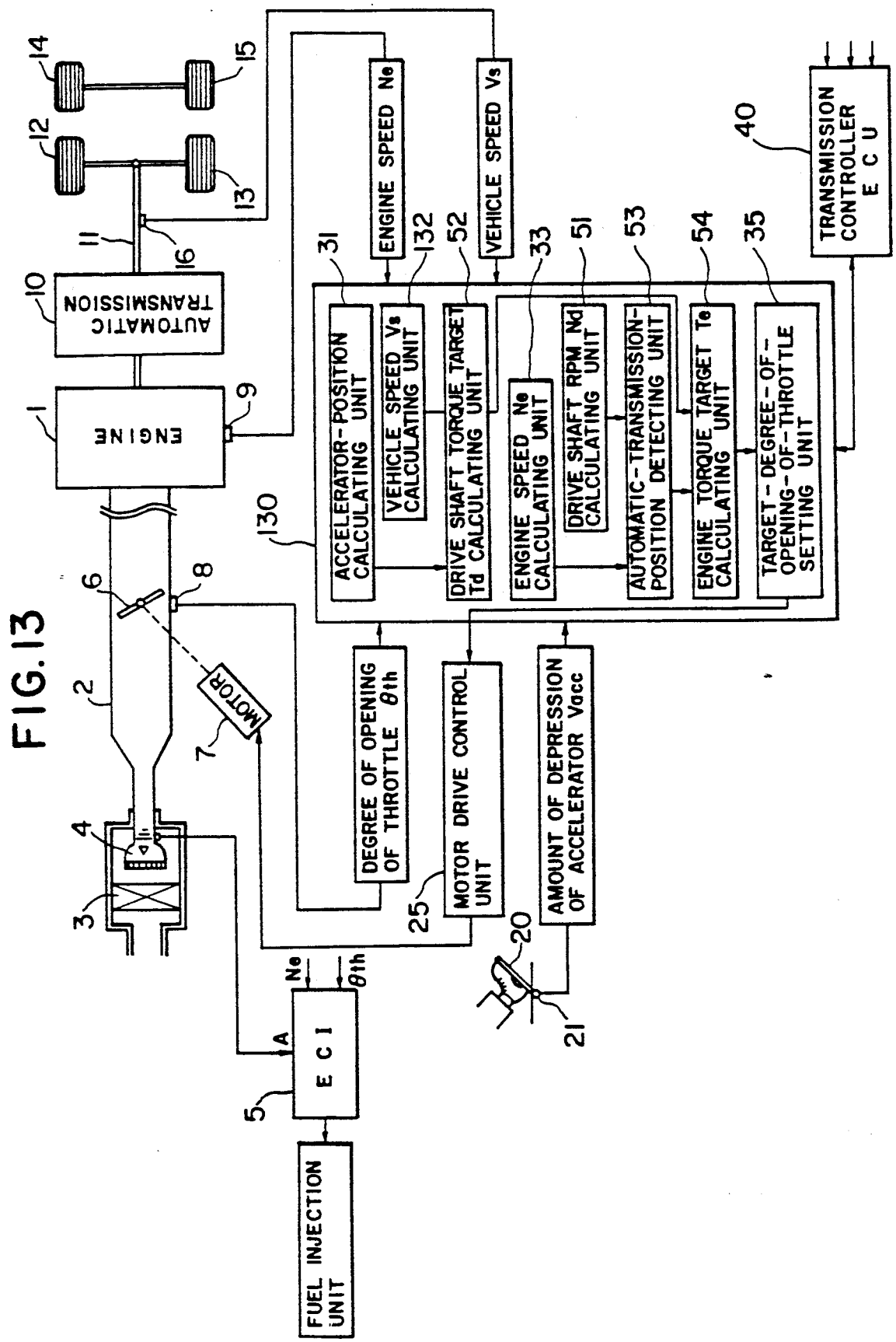
FIG. 13 is a schematic diagram similar to FIGS. 1 and 9, but showing a fifth embodiment.

Specifically, as shown in FIG. 13, the DBW controller 130 is composed of a drive shaft r.p.m. (revolutions per minute) Nd calculating unit 51, a drive shaft torque target Td calculating unit 52, an automatic transmission state detecting unit 53, and a engine torque target Te calculating unit 54. The same reference numerals as those in FIG. 9 designate similar parts in FIG. 13.

The drive shaft r.p.m. Nd calculating unit 51 converts the drive shaft r.p.m. Nd based on the wheel speed sensor output from the wheel speed sensor 16.

The drive shaft torque target Td calculating unit 52 calculates the drive shaft torque target Td from the position of depression of the accelerator pedal Vacc and the vehicle speed Vs. The relation between the position of depression of the accelerator pedal Vacc, the vehicle speed Vs, and the drive shaft torque target Td is indicated in a memory map 4 of FIG. 11. Reading the drive shaft torque target Td as the engine torque target Te, the calculation can be made from the memory map 4 of FIG. 11.

The automatic transmission state detecting unit 53 calculates the transmission gear ratio or the torque ratio from the engine speed Ne and the drive shaft r.p.m. Nd and transmits these data to the engine torque target calculating unit 54.

Figure 15:
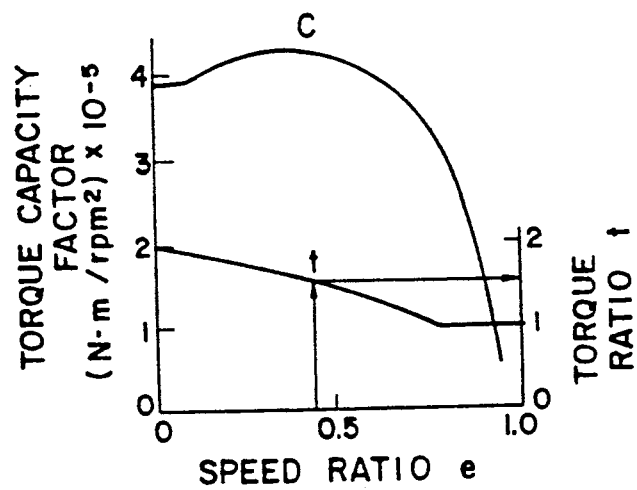
FIG. 15 is a characteristic graph showing the relationship between the engine torque, the speed ratio and the torque ratio in the system of FIG. 13.

As the torque ratio t is to be obtained from the transmission gear ratio e, it is calculated based on the characteristic graph shown in FIG. 15.

The engine torque target calculating unit 54 calculates the engine torque target Te from the drive shaft output torque target Td and the automatic transmission state (speed ratio and torque ratio). The relation between the drive shaft torque target Td and the engine torque target Te is determined from the state of the automatic transmission 10, being expressed by the equation: Te = Td / (c × $\rho$) (c is a time constant).

Then the engine torque target Te is transmitted to the target-degree-of-opening-of-throttle calculating unit 35 where the target degree of opening of throttle $\theta$target is obtained.

The target degree of opening of throttle $\theta$target is obtained, based on the engine torque target Te and the engine speed Ne, from the characteristic graph of FIG. 12

Figure 14:
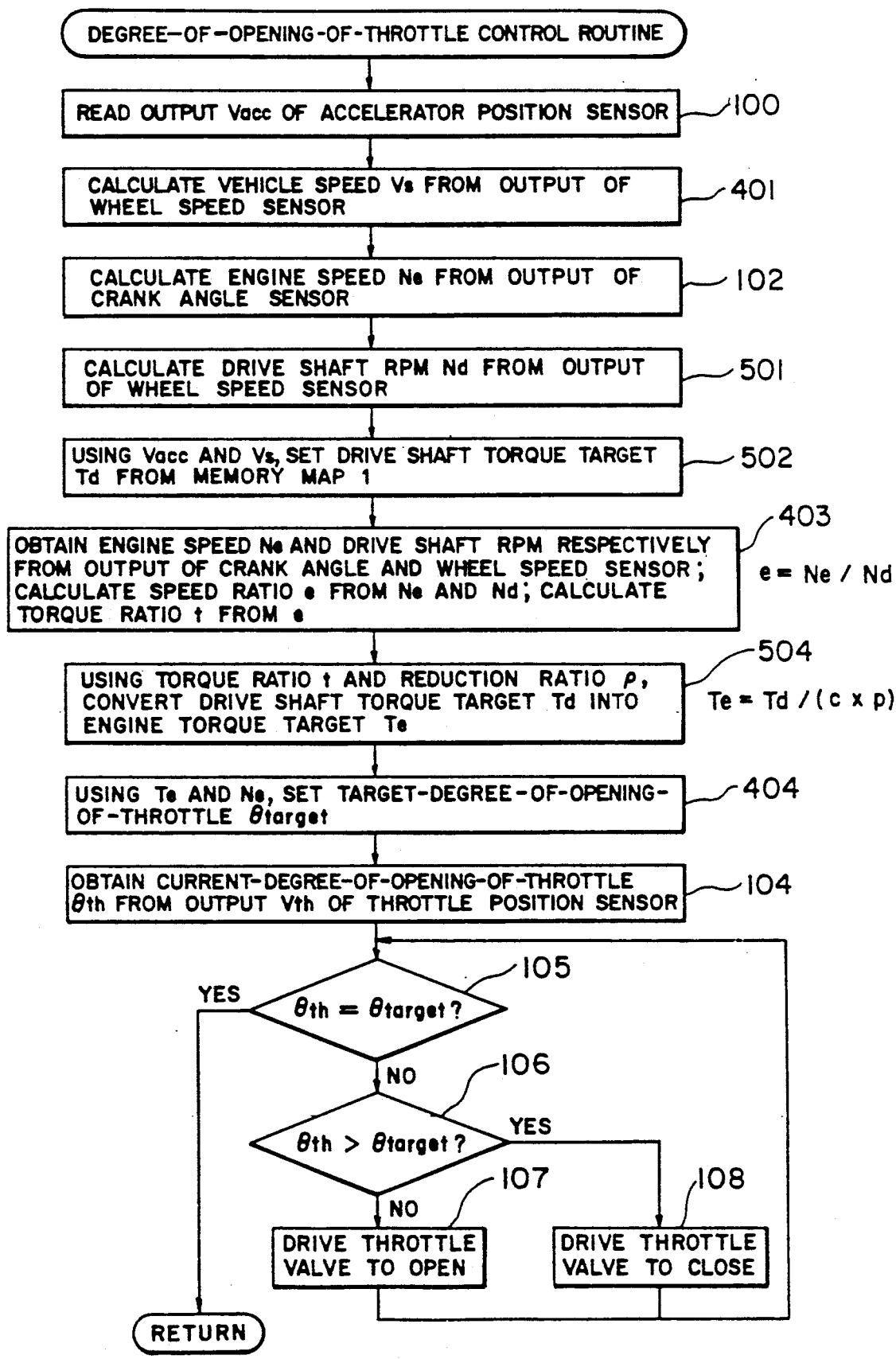
FIG. 14 is a flowchart showing the mode of operation of the fifth embodiment.

In this arrangement, the engine is controlled according to the routine procedure indicated in the flowchart of FIG. 14.

Specifically, at step 100, the accelerator pedal position Vacc is read by the signal from the accelerator position sensor 21, and at step 401, the vehicle speed Vs is calculated from the wheel speed sensor 16, and further at step 102, engine speed Ne is calculated based on the output of the crank angle sensor 9, which are conducted in the same manner as in the case of FIG. 10.

In this embodiment at step 501, the calculating unit 51 converts the drive shaft r.p.m. Nd from the wheel speed sensor 16.

Then at step 502, in the drive shaft torque target setting unit 52, the drive shaft torque target Td is set from the accelerator pedal depression position Vacc and the vehicle speed Vs. The drive shaft torque target Td can be converted, as described above, from the memory map 4 shown in FIG. 11.

At step 503, the automatic transmission state detecting unit 53 calculates the state of the transmission 10, i.e., the transmission gear ratio e and the torque ratio t. In this case, the transmission gear ratio e is obtained from the engine speed Ne and the drive shaft r.p.m. Nd, and then the torque ratio t is obtained from this transmission gear ratio e.

Transmission ratio e = engine speed Ne / drive shaft r.p.m. Nd.

Further, for obtaining the torque ratio t from the transmission gear ratio e, it can be calculated based on a characteristic graph shown in FIG. 15.

Then at step 504, in the engine torque target calculating unit 54, the drive shaft torque target is converted into the engine torque target Te, using the torque ratio t and the reduction ratio $\rho$.

The relation between the drive shaft torque target Td and the engine torque target Te is determined from the state of the transmission 10, being expressed by the equation: Te = Td / (c × $\rho$) (c is a time constant). Consequently, in the engine torque target calculating unit 54, the engine torque target Te can be calculated.

At step 404, in the target-degree-of-opening-ofthrottle setting unit 35, the target degree of opening of throttle $\theta$target is calculated using the engine torque target Te and the engine speed Ne.

The relation between the engine torque target Te, the engine speed Ne, and the target degree of opening of throttle $\theta$target is shown in the characteristic graph of FIG. 12. Therefore, if the engine torque target Te and the engine speed Ne are known, it is possible to set the target degree of opening of throttle $\theta$target.

Given that the target degree of opening of throttle $\theta$target has thus been obtained, the degree of opening of the throttle valve 6, as driven by the electric motor 7, can be controlled based on the routine procedure indicated at steps 104 through 108, like the embodiment of FIG. 9.

Therefore, also in this case, when the vehicle is making a downhill running with the accelerator pedal depression position kept constant, the vehicle speed converges, thus giving to the driver no different feeling or touch, compared with when operating the engine equipped with a throttle control system of the mechanical link type.

In the fourth and fifth embodiments, the engine torque target Te is obtained from the accelerator pedal position Vacc, the vehicle speed Vs, the engine speed Ne, etc., and the target degree of opening of throttle $\theta$target to create this engine torque target Te is set. As this target degree of opening of throttle $\theta$target and the actual degree of opening of throttle $\theta$th are compared with each other, the throttle valve 6 is controlled so as to meet with the target degree of opening of throttle $\theta$target. After in addition to the above-mentioned control means, the throttle valve 6 has met with the target degree of opening of throttle $\theta$target, the system according to this invention detects whether the current engine torque and the engine torque target Te meet with each other. If there is a differential between the actual engine torque and the engine torque target Te, this is preferably feedback-controlled to make a correction such that the actual engine torque meets the engine torque target.

In the foregoing embodiments, the position of the throttle valve 6 is detected by the throttle position sensor 8 such as a potentiometer. Alternatively, in the case where the electric motor 7 is a stepper motor, since the angular position of this stepper motor is calculated from a given number of pulses, the number of pulses may be counted and may be stored so that the number of pulses is added and subtracted commensurate with the amount of angular movement of the motor to confirm the position of the throttle valve 6. Therefore, instead of the throttle position sensor 8, a pulse counting means may be used.

Further, the DBW control system of this invention may be used with, in addition to the automatic transmission control system, an idling rotation control system or an auto-cruise control system. In short, the throttle valve may be used in an electrically driven motor.

In the fourth and fifth embodiments, the DBW control system of this invention is applied to a gasoline engine, and the degree of opening of throttle valve located in the intake air passage is controlled by the electric motor. However, this invention may be also applied to a diesel engine, and in the case of diesel engine, the amount of fuel is controlled by adjusting the control rack of a fuel injection pump, so that the output of the engine can be controlled. By driving the control rack of the fuel injection pump by the electric motor, it is possible to control the engine in the same manner as the fourth and fifth embodiments.

As described above, according to the engine output controlling method as defined in claim 1, the driver's required engine torque commensurate with the state of operation of the accelerator pedal. For example, if this invention is applied such as to an automobile, it is possible to control the engine properly commensurate with the state of operation of the accelerator pedal to obtain a desired vehicle speed, acceleration, etc.

Further, according to the engine output controlling method as defined in claim 2, partly since the required target amount of intake air is calculated commensurate with the position of depression or the state of operation, such as the depressing speed, of the accelerator pedal, and partly since the target amount of engine control, such as the target degree of opening of throttle $\theta$target, is set to obtain this target amount of intake air so that the engine output control means such as the throttle is set to this target degree of opening of throttle, the target amount of intake air is calculated directly from the state of operation of the accelerator pedal to promptly produce the engine output required by the state of operation of the accelerator pedal. Consequently, it quickly responses to the state of operation of the accelerator pedal, causing good response of accelerated running, for example. Further, when putting this invention into practice, sensors now on the market may be used for the air flow sensor, the engine speed detecting means, the throttle position detecting means, etc., requiring no additional special sensors.

Still further, according to the engine output controlling method as defined in claim 5, in the case where the position of operation of the accelerator pedal is constant, the engine torque target Te is obtained in such a manner that the vehicle speed converges, and the target amount of engine control $\theta$target from this engine torque target Te and the engine speed Ne, and the engine output control means such as a throttle valve is controlled so as to meet with the target amount of engine control. Consequently, since the vehicle speed automatically converges when the position of operation of the accelerator pedal is constant, the driver does not need to return the accelerator pedal even when the vehicle speed increases such as during a downhill running, thus giving to the driver a different feeling or touch, compared with when operating the engine equipped with a throttle control system of the mechanical link type.

What is claimed is:

1. A method of controlling output of an engine using an engine output control apparatus including an engine output control means for controlling the output of the engine, an electric motor for driving the control means, motor control means for controlling the electric motor commensurate with a state of operation of an accelerator pedal, and means for determining the engine speed, said method comprising the steps of:

calculating a target amount of intake air per engine rotation representative of a target engine torque based on the state of operation of the accelerator pedal;

calculating a target engine control amount from said target amount of intake air per engine rotation and the engine speed; and controlling the engine output control means using the electric motor in accordance with the target engine control amount.

2. An engine output controlling method according to claim 1, wherein the state of operation of said accelerator pedal is the position of operation of said accelerator pedal.

* * * * *